United States Patent
Tian

(10) Patent No.: US 12,495,067 B2
(45) Date of Patent: Dec. 9, 2025

(54) METHOD, SYSTEM AND DEVICE FOR DYNAMICALLY PREVENTING TRAFFIC ATTACKS, AND STORAGE MEDIUM

(71) Applicant: INSPUR SUZHOU INTELLIGENT TECHNOLOGY CO., LTD., Jiangsu (CN)

(72) Inventor: Lin Tian, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 351 days.

(21) Appl. No.: 18/013,782

(22) PCT Filed: Feb. 25, 2021

(86) PCT No.: PCT/CN2021/077807
§ 371 (c)(1),
(2) Date: Dec. 29, 2022

(87) PCT Pub. No.: WO2022/012054
PCT Pub. Date: Jan. 20, 2022

(65) Prior Publication Data
US 2023/0319102 A1    Oct. 5, 2023

(30) Foreign Application Priority Data
Jul. 17, 2020  (CN) .......................... 202010695440.9

(51) Int. Cl.
*H04L 9/40* (2022.01)
*H04L 47/215* (2022.01)

(52) U.S. Cl.
CPC ........ *H04L 63/1458* (2013.01); *H04L 47/215* (2013.01); *H04L 63/1425* (2013.01); *H04L 63/20* (2013.01)

(58) Field of Classification Search
CPC ............... H04L 63/1458; H04L 47/215; H04L 63/1425; H04L 63/20
See application file for complete search history.

(56) References Cited

U.S. PATENT DOCUMENTS

2010/0322071 A1*  12/2010  Avdanin ................ H04L 47/215
                                                370/230
2012/0044805 A1*   2/2012  Lee ................... H04W 28/0268
                                                370/230

FOREIGN PATENT DOCUMENTS

| CN | 103929366 A | 7/2014 |
| CN | 108768873 A | 11/2018 |

(Continued)

OTHER PUBLICATIONS

Search report for International application No. PCT/CN2021/077807 mailed on May 12, 2021.
(Continued)

*Primary Examiner* — Matthew T Henning
(74) *Attorney, Agent, or Firm* — Dennemeyer & Associates LLC

(57) ABSTRACT

A method, system and device for dynamically preventing traffic attacks, and a storage medium. The method includes: upon receiving a traffic flood peak, buffering unprocessed traffic by using a queue mechanism; taking an unprocessed traffic message according to a token, and calling a service processing flow to process traffic data; and dynamically controlling a token generation rate according to a real processing speed within a unit time.

17 Claims, 2 Drawing Sheets

(56) References Cited

FOREIGN PATENT DOCUMENTS

| | | |
|---|---|---|
| CN | 109729013 A | 5/2019 |
| CN | 112003795 A | 11/2020 |
| WO | 2009012811 A1 | 1/2009 |

OTHER PUBLICATIONS

Search report for Chinese application No. 202010695440.9 filed on Jul. 17, 2020.

\* cited by examiner

Traffic buffering
apparatus

Token bucket
apparatus

Control
apparatus

Processing
apparatus

METHOD, SYSTEM AND DEVICE FOR DYNAMICALLY PREVENTING TRAFFIC ATTACKS, AND STORAGE MEDIUM

CROSS-REFERENCE TO RELATED APPLICATION

The present disclosure claims the priority of Chinese Patent Application 202010695440.9, filed in the Chinese Patent Office on Jul. 17, 2020, and entitled "Method, System and Device for Dynamically Preventing Traffic Attack, and Storage Medium", the entire contents of which are herein incorporated by reference.

TECHNICAL FIELD

The present disclosure relates to the field of traffic attack prevention, and in particular, to a method, system and device for dynamically preventing traffic attacks, and a storage medium.

BACKGROUND

An application system needs to deal with traffic attacks on the application system by scenarios such as a large amount of data processing required by background logic or an unexpected request amount (e.g., centralized outbreak of a series of operations of a large number of users), and these traffic attacks bring great load challenges to the stability of the application system, the utilization rate of a CPU (Central Processing Unit, central processing unit), the memory utilization rate, the message transmission channel, the protocol chain and the like of the system.

In a high-concurrency large-traffic application system, the traffic is generally controlled by three tools, which are respectively: buffering, current limiting and degradation, wherein current limiting is to limit the concurrency of the traffic by means of certain means for scenarios such as scarce resources (e.g., a CPU, a memory and the like) or according to service requirements, so as to effectively protect the stability of the application system. There are many implementation manners of current limiting, and at present, current limiting algorithms are mainly divided into three types, that is, a counter/time window method, a leaky bucket method and a token bucket method.

The counter/time window method achieves the objective of current limiting by means of setting the maximum number of accesses within a unit time, for example, QPS (Queries-per-second, queries-per-second) is set to be 60, and then it is defined that an interface may only be accessed 60 times per second. However, when the traffic reaches a peak value within the first 1% time, then the traffic is in a silent state within the later 99% time and is blocked outside, and this defect is also referred to as a "spike effect".

Compared with the counter method, the leaky bucket method effectively avoids the "spike effect", the leaky bucket method is implemented by periodically taking elements on a queue with a fixed size, like a leaky bucket holding water, only the water outlet rate of the container is limited, and when the water inlet rate is too large, the water overflows, that is, rejected traffic. However, the leaky bucket cannot actually deal with burst traffic flood peaks, and the efficiency is not high.

The token bucket method is based on the prototype of a bucket, but it is distinct from the leaky bucket in that there is no water outlet. The traffic is controlled by a token generation rate and the volume of a token bucket, thereby effectively solving the problem of low efficiency of the leaky bucket. When the volume of the bucket is 100, and the token generation rate is 50 per second, then it means that the maximum traffic bearing capacity is 100 when the bucket is full of tokens. When the flood peak is always high, the traffic may also be processed at a constant rate of 50 per second, so that the flood peak traffic is effectively processed without crushing the bucket.

However, the token generation rate in the token bucket method is difficult to be evaluated, is manually set according to human experience in general, is very difficult to be dynamic, and cannot be automatically adjusted on the basis of resources of a hardware device, such that the flexibility is insufficient. Moreover, the capacity of the bucket is generally fixed and relatively small, and when the bucket is full, traffic data is directly discarded, and in some scenarios with fixed frequencies and zigzag sudden outbreak of fixed data volumes, the discarded data will absolutely cause service errors.

SUMMARY

In order to achieve the above objectives, the present disclosure utilizes the following technical solutions:

A method for dynamically preventing traffic attacks, including:
  upon receiving a traffic flood peak, unprocessed traffic is buffered by using a queue mechanism;
  an unprocessed traffic message is taken according to a token, and a service processing flow is called to process traffic data; and
  a token generation rate is dynamically controlled according to a real processing speed within a unit time.

In some embodiments, the type of the queue is determined according to a service, and when the service can determine the maximum number of traffic flood peaks, the queue is an unbounded queue; and
  when the service cannot determine the maximum number of traffic flood peaks, the queue is a bounded queue, and a queue policy is a refuse or wait policy when the queue is full.

In some embodiments, the step of dynamically controlling the token generation rate according to the real processing speed within the unit time, specifically includes:
  a difference value between inflow traffic and taken traffic within a previous unit time is calculated, so as to obtain an amount of denial of service; and
  the token generation rate is controlled according to the amount of denial of service.

In some embodiments, the step of controlling the token generation rate according to the amount of denial of service, specifically includes:
  an idle ratio and the amount of processed traffic within a unit time of a service thread pool are obtained according to a starting time and an ending time of a working thread;
  when the amount of denial of service is a negative value, the amount of processed traffic within the previous unit time is taken as the token generation rate;
  when the amount of denial of service is a positive value, determining whether the idle ratio reaches a system processing bottleneck, and when the idle ratio reaches the system processing bottleneck, a preset reservation value is subtracted from the total processing amount as the token generation rate; and when the idle ratio reaches the system processing bottleneck, the formula of the token generation rate is:

the token generation rate=(the current number of tokens*2>the current number of tokens/(100%-idle ratio))?the current number of tokens/(100%-idle ratio):the current number of tokens*2.

In some embodiments, the preset reservation value is set to be 10% of the maximum processing capability of the system.

In some embodiments, the size of the service thread pool is determined according to a user service.

The embodiments of the present disclosure further provide a system for dynamically preventing a traffic buffering device used for, upon receiving a traffic flood peak, buffering unprocessed traffic by using a queue mechanism;

a token bucket device, configured to generating a token, taking an unprocessed traffic message from the traffic buffering device according to the token, and placing the unprocessed traffic message in a processing device for execution;

the processing device, configured to calling a service processing flow to process traffic data; and a control device, configured to dynamically controlling a token generation rate in the token bucket device according to a real processing speed within a unit time.

In some embodiments, the processing device is configured to obtain an idle ratio and the amount of processed traffic within the unit time of a service thread pool according to a starting time and an ending time of a working thread;

the control device is configured to calculate a difference value between inflow traffic and taken traffic within a previous unit time, so as to obtain an amount of denial of service, and controls the token generation rate according to the amount of denial of service;

when the amount of denial of service is a negative value, the control device is configured to take the amount of processed traffic of the processing device within the previous unit time as the token generation rate;

when the amount of denial of service is a positive value, the control device is configured to determine whether the idle ratio of the processing device reaches a system processing bottleneck, and when the idle ratio reaches the system processing bottleneck, the control device is configured to subtract a preset reservation value from the total processing amount of the processing device as the token generation rate; and when the idle ratio reaches the system processing bottleneck, the formula of the token generation rate is:

the token generation rate=(the current number of tokens*2>the current number of tokens/(100%-idle ratio))?the current number of tokens/(100%-idle ratio):the current number of tokens*2.

The embodiments of the present disclosure further provide a device for dynamically preventing a memory, configured to storing a computer program; and a processor used for, when executing the computer program, implementing the steps of the method for dynamically preventing traffic attacks as described above.

The embodiments of the present disclosure further provide a storage medium, wherein a computer program is stored on the storage medium, and when executed by a processor, the computer program implements the steps of the method for dynamically preventing traffic attacks as described above.

DETAILED DESCRIPTION OF THE EMBODIMENTS

Figures 1, 2:
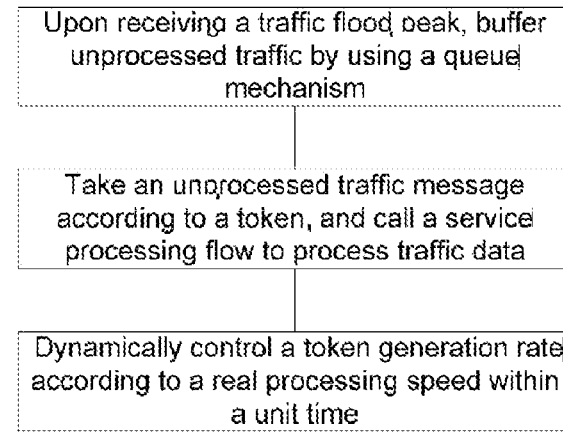
FIG. 1 is a schematic flow diagram of a method for dynamically preventing traffic attacks according to an embodiment of the present disclosure.
FIG. 2 is a schematic structural diagram of a system for dynamically preventing traffic attacks according to an embodiment of the present disclosure.

In order to clearly illustrate the technical features of the present solution, the present disclosure is described in detail below by way of specific embodiments and in conjunction with the drawings. The following disclosure provides many different embodiments or examples for implementing different structures of the present disclosure. In order to simplify the disclosure of the present disclosure, components and settings of specific examples are described below. In addition, the present disclosure may repeat reference numerals and/or letters in different examples. This repetition is for the purpose of simplicity and clarity, and does not in itself indicate a relationship between the various discussed embodiments and/or settings. It should be noted that, the components illustrated in the drawings are not necessarily drawn to scale. The present disclosure omits descriptions of well-known components and processing techniques and processes, so as to avoid unnecessarily limiting the present disclosure.

As shown in FIG. 1, an embodiment of the present disclosure discloses a method for dynamically preventing traffic attacks, including:

upon receiving a traffic flood peak, unprocessed traffic is buffered by using a queue mechanism;

an unprocessed traffic message is taken according to a token, and a service processing flow is called to process traffic data; and a token generation rate is dynamically controlled according to a real processing speed within a unit time. Therefore, it is ensured that a service can occupy system resources in a retractable manner.

In some embodiments, the type of the queue is determined according to a service, and when the service can determine the maximum number of traffic flood peaks, the queue is an unbounded queue;

when the service cannot determine the maximum number of traffic flood peaks, the queue is a bounded queue, and a queue policy is a refuse or wait policy when the queue is full, and discards messages that cannot be stored after reaching the critical capacity, thereby preventing the excessive use of a memory.

At the same time, the amount of inflow and outflow data within the unit time is recorded.

The step of dynamically controlling the token generation rate according to the real processing speed within the unit time, specifically includes:

a difference value is calculated between inflow traffic and taken traffic within a previous unit time, so as to obtain an amount of denial of service; and the token generation rate is controlled according to the amount of denial of service.

The step of controlling the token generation rate according to the amount of denial of service, specifically includes:

an idle ratio and the amount of processed traffic within the unit time of a service thread pool is obtained according to a starting time and an ending time of a working thread;

when the amount of denial of service is a negative value, the amount of processed traffic within the previous unit time is taken as the token generation rate;

when the amount of denial of service is a positive value, it is determined whether the idle ratio reaches a system processing bottleneck, and when the idle ratio reaches the system processing bottleneck, a preset reservation value is subtracted from the total processing amount as the token generation rate; and when the idle ratio reaches the system processing bottleneck, the formula of the token generation rate is:

the token generation rate=(the current number of tokens*2>the current number of tokens/(100%-idle ratio)) ?the current number of tokens/(100%-idle ratio): the current number of tokens*2. That is, determine whether twice the current number of tokens is greater than the maximum capability (i.e., the current number of tokens/(100%-idle ratio)) of the processing device, and if so, use the maximum capability of the processing device as the token generation rate, and if not, use twice the current number of tokens as the token generation rate.

The size of the service thread pool is determined according to a user service.

The preset reservation value is designed for protecting a system from being persistently full load, such that other applications cannot be used or the own application of the system cannot be used due to the limitation of the system. Preferably, the preset reservation value may be set to be 10% of the maximum processing capability of the system, for example, when the processing device may process at most ten thousand events per second, then it is suggested that a maximum capability value is defined to be 9000, that is, the preset reservation value is 1000, thereby ensuring that the system does not persistently reach the peak value, and accordingly, the stability of the operation can be ensured.

As shown in FIG. 2, an embodiment of the present disclosure further discloses a system for dynamically preventing traffic attacks, including:

a traffic buffering device, configured to: upon receiving a traffic flood peak, buffer unprocessed traffic by using a queue mechanism;

a token bucket device, configured to generate a token, taking an unprocessed traffic message from the traffic buffering device according to the token, and placing the unprocessed traffic message in a processing device for execution;

the processing device, configured to call a service processing flow to process traffic data; and a control device, configured to dynamically control a token generation rate in the token bucket device according to a real processing speed within a unit time.

Figure 3:
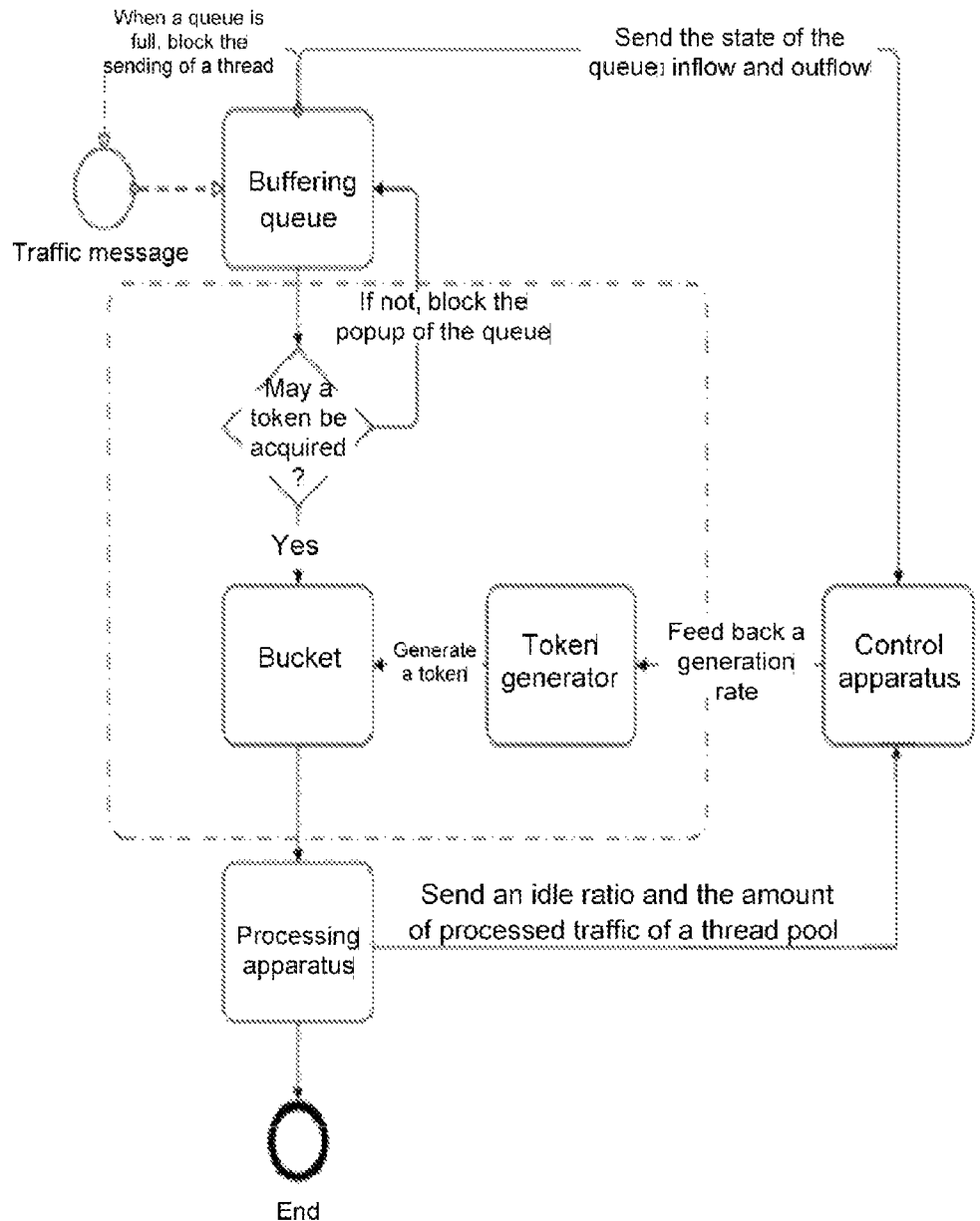
FIG. 3 is a schematic diagram of a use flow of the system for dynamically preventing traffic attacks according to an embodiment of the present disclosure.

As shown in FIG. 3, the token bucket device takes the traffic message, places the traffic message in the processing device for execution, and meanwhile, generates the token at the rate specified by the control device. When the traffic message is fetched, the token in the bucket needs to be acquired first. Meanwhile, the capacity of the token bucket and the generation rate within the unit time are kept consistent, thereby ensuring that there is no backlog of data in the token bucket.

When there are traffic messages in the traffic buffering device, a token bucket thread continuously is configured to take messages from the traffic buffering device.

When the message is fetched, the token needs to be acquired at first, and when there is a token, the message is placed in the processing device for processing; and when there is no available token, the thread is changed into a waiting state.

A generation rate interface of the token bucket device may receive the rate specified by the control device, so as to dynamically generate tokens.

When the number of generated tokens has reached the capacity of the token bucket, the generation of the tokens is stopped. Once the capacity of the token bucket is not full, the generation of the tokens is continued, and the tokens are placed in the token bucket.

The control device is used for dynamically controlling the generation rate of the tokens, so as to achieve the target of non-human intervention. For example, in a single-core single-block CPU scenario and a multi-core multi-CPU scenario, the traffic processing rates are definitely different, at this time, it is difficult to enable the program to run to reach an optimal state according to human experience, and the rate can just be simply reduced to a certain safe low speed, so as to ensure the stability of the system. Through the algorithm of the control device, an effect of no intervention of manual experience can be achieved, and the token generation rate of the token bucket is dynamically controlled.

In some embodiments, the control device obtains the amount of denial of service according to a difference value between inflow traffic and taken traffic within a previous unit time. When the amount of denial of service is a negative value, it indicates that the current traffic does not reach the traffic flood peak that may be accommodated by the application system, and at this time, the control device takes the amount of processed traffic of the processing device within the previous unit time as the token generation rate in the token bucket. Therefore, the occupation of resources such as the CPU is automatically reduced.

When the amount of denial of service is a positive value, it indicates that the current traffic has exceeded the current token generation rate of the control device, which is defined on the basis of the amount of processed traffic within the previous unit time, at this time, it is necessary to determine again, according to the idle ratio of the processing device, whether the system processing bottleneck has been reached, and then to expand the capacity of the token generation rate.

When the system processing bottleneck has been reached, at this time, a preset reservation value is subtracted from the total processing amount of the processing device as the token generation rate in the token bucket. In order to reduce the utilization of resources such as the CPU and protect the stable operation of the application program, the operation performance is intentionally reduced by a part of value, for example, the utilization rate of the CPU is (the unit time−the idle tie of the CPU within the unit time)*100%, and the reservation value is a time when the CPU is intentionally kept idle.

When the system processing bottleneck is not reached, the formula of the token generation rate is formulated on the basis of the idle ratio of the processing device and the current number of tokens as follows:

the token generation rate=(the current number of tokens*2>the current number of tokens/(100%-idle ratio))?the current number of tokens/(100%-idle ratio): the current number of tokens*2.

The processing device calls service processing logic to process traffic data. In some embodiments, the processing device creates a tangent plane, and calls the service processing logic. In the tangent plane, a starting time is recorded before the processing logic is called, and a completion time is recorded after the processing is completed. A thread pool is configured, and the size of the thread pool is selected on the basis of the requirements of a user service. An interface is provided to obtain an idle ratio and the amount of processed traffic within the unit time of the thread pool according to the starting time and the ending time of a working thread.

An embodiment of the present disclosure further discloses a device for dynamically preventing traffic attacks, including:
a memory, configured to storing a computer program; and
a processor used for, when executing the computer program, implementing the steps of the method for dynamically preventing traffic attacks as described above.

An embodiment of the present disclosure further discloses a storage medium, wherein a computer program is stored on the storage medium, and when executed by a processor, the computer program implements the steps of the method for dynamically preventing traffic attacks as described above.

Although the specific embodiments of the present disclosure have been described above in conjunction with the drawings, the protection scope of the present disclosure is not limited thereto. For those skilled in the art to which the present disclosure belongs, other different forms of modifications or deformations may also be made on the basis of the foregoing descriptions. There is no need and no way to enumerate all embodiments herein. On the basis of the technical solutions of the present disclosure, various modifications or deformations, which may be made by those skilled in the art without any creative effort, still fall within the protection scope of the present disclosure.

What is claimed is:

1. A method for dynamically preventing traffic attacks, comprising:
upon receiving a traffic flood peak, buffering unprocessed traffic by using a queue mechanism;
taking an unprocessed traffic message according to a token, and calling a service processing flow to process traffic data; and
dynamically controlling a token generation rate according to a real processing speed within a unit time,
wherein the dynamically controlling the token generation rate according to the real processing speed within the unit time comprises;
calculating a difference value between inflow traffic and taken traffic within a previous unit time, so as to obtain an amour of service; and
controlling the token generation rate according to the amount of denial of service.

2. The method for dynamically preventing traffic attacks as claimed in claim 1, wherein a type of a queue is determined according to a service, and when the service can determine the maximum number of traffic flood peaks, the queue is an unbounded queue; and
when the service cannot determine a maximum number of traffic flood peaks, the queue is a bounded queue, and a queue policy is a refuse or wait policy when the queue is full.

3. The method for dynamically preventing traffic attacks as claimed in claim 1, wherein the step of controlling the token generation rate according to the amount of denial of service comprises:
obtaining an idle ratio and an amount of processed traffic within a unit time of a service thread pool according to a starting time and an ending time of a working thread;
when the amount of denial of service is a negative value, taking the amount of processed traffic within the previous unit time as the token generation rate;
when the amount of denial of service is a positive value, determining whether the idle ratio reaches a system processing bottleneck, and when the idle ratio reaches the system processing bottleneck, subtracting a preset reservation value from a total processing amount as the token generation rate; and
when the idle ratio does not reaches the system processing bottleneck, the formula of the token generation rate is:
the token generation rate=(a current number of tokens * 2>the current number of tokens/(100%-idle ratio))?the current number of tokens/(100%-idle ratio): the current number of tokens * 2, wherein determining whether twice the current number of tokens is greater than maximum capability of the processing device, and if twice the current number of tokens is greater than maximum capability of the processing device, using the maximum capability of the processing device as the token generation rate, and if twice the current number of tokens is not greater than the maximum capability of the processing device, using twice the current number of tokens as the toke generation rate.

4. The method for dynamically preventing traffic attacks as claimed in claim 3, wherein the preset reservation value is set to be 10% of a maximum processing capability of the system.

5. The method for dynamically preventing traffic attacks as claimed in claim 1, wherein the size of a service thread pool is determined according to a user service.

6. The method for dynamically preventing traffic attacks as claimed in claim 1, a capacity of a token bucket and the token generation rate within the unit time are consistent, where the token bucket is used for storing tokens.

7. The method for dynamically preventing traffic attacks as claimed in claim 1, when a number of generated tokens reach a capacity of a token bucket for storing tokens, the generation of the tokens is stopped.

8. The method for dynamically preventing traffic attacks as claimed in claim 1, when the capacity of the token bucket is not full, the generation of the tokens is continued.

9. A device for dynamically preventing traffic attacks, comprising:
a memory, configured to storing a computer program; and
a processor configured to, when executing the computer program, cause the processor to:
upon receiving a traffic flood peak, buffer unprocessed traffic by using a queue mechanism;
take an unprocessed traffic message according to a token, and call a service processing flow to process traffic data; and
dynamically control a token generation rate according to a real processing speed within a unit time;

the processor is configured to calculate a difference value between inflow traffic and taken traffic within a previous unit time, so as to obtain an amount of denial of service, and control the token generation rate according to the amount of denial of service.

10. The device for dynamically preventing traffic attacks as claimed in claim 9,
wherein a type of a queue is determined according to a service, and when the service can determine a maximum number of traffic flood peaks, the queue is an unbounded queue; and
when the service cannot determine the maximum number of traffic flood peaks, the queue is a bounded queue, and a queue policy is a refuse or wait policy when the queue is full.

11. The device for dynamically preventing traffic attacks as claimed in claim 9, the processor is configured to obtain an idle ratio and an amount of processed traffic within a unit time of a service thread pool according to a starting time and an ending time of a working thread; when the amount of denial of service is a negative value, take the amount of processed traffic within the previous unit time as the token generation rate; when the amount of denial of service is a positive value, determine whether the idle ratio reaches a system processing bottleneck, and when the idle ratio reaches the system processing bottleneck, subtract a preset reservation value from a total processing amount as the token generation rate; and when the idle ratio does not reaches the system processing bottleneck, the formula of the token generation rate is:
the token generation rate=(a current number of tokens * 2>the current number of tokens/(100%-idle ratio))?the current number of tokens/(100%-idle ratio): the current number of tokens * 2, that is, determine whether twice the current number of tokens is greater than maximum capability of the processing device, and if twice the current number of tokens is greater than maximum capability of the processing device, use the maximum capability of the processing device as the token generation rate, and if twice the current number of tokens is not greater than maximum capability of the processing device, use twice the current number of tokens as the token generation rate.

12. The device for dynamically preventing traffic attacks as claimed in claim 11, wherein the preset reservation value is set to be 10% of a maximum processing capability of the system.

13. The device for dynamically preventing traffic attacks as claimed in claim 9, wherein the size of a service thread pool is determined according to a user service.

14. A non-transitory storage medium, storing a computer program that when executed by a processor causes the processor to:

upon receiving a traffic flood peak, buffer unprocessed traffic by using a queue mechanism;
take an unprocessed traffic message according to a token, and call a service processing flow to process traffic data; and
dynamically control a token generation rate according to a real processing speed within a unit time;
the processor is configured to calculate a difference value between inflow traffic and taken traffic within a previous unit time, so as to obtain an amount of denial of service, and control the token generation rate according to the amount of denial of service.

15. The non-transitory storage medium as claimed in claim 14,
wherein a type of a queue is determined according to a service, and when the service can determine a maximum number of traffic flood peaks, the queue is an unbounded queue; and
when the service cannot determine the maximum number of traffic flood peaks, the queue is a bounded queue, and a queue policy is a refuse or wait policy when the queue is full.

16. The non-transitory storage medium as claimed in claim 14, wherein the processor is configured to: obtain an idle ratio and an amount of processed traffic within a unit time of a service thread pool according to a starting time and an ending time of a working thread; when the amount of denial of service is a negative value, take the amount of processed traffic within the previous unit time as the token generation rate; when the amount of denial of service is a positive value, determine whether the idle ratio reaches a system processing bottleneck, and when the idle ratio reaches the system processing bottleneck, subtract a preset reservation value from total processing amount as the token generation rate; and when the idle ratio does not reaches the system processing bottleneck, the formula of the token generation rate is:
the token generation rate=(a current number of tokens * 2>the current number of tokens/(100%-idle ratio))?the current number of tokens/(100%-idle ratio): the current number of tokens * 2, that is, determine whether twice the current number of tokens is greater than maximum capability of the processing device, and if twice the current number of tokens is greater than maximum capability of the processing device, use the maximum capability of the processing device as the token generation rate, and if twice the current number of tokens is not greater than maximum capability of the processing device, use twice the current number of tokens as the token generation rate.

17. The non-transitory storage medium as claimed in claim 16, wherein the preset reservation value is set to be 10% of the maximum processing capability of the system.

* * * * *